March 24, 1931. R. F. FRYE 1,797,766
REPAIR PLUG
Filed April 4, 1928

INVENTOR:
RAY F. FRYE
BY Frank D. Gray
ATTORNEY.

Patented Mar. 24, 1931

1,797,766

UNITED STATES PATENT OFFICE

RAY F. FRYE, OF CLEVELAND, OHIO

REPAIR PLUG

Application filed April 4, 1928. Serial No. 267,374.

My invention relates to repair plugs such as water plugs, or devices for closing relatively small holes in containers often created by rust.

Heretofore a number of improved devices for repair purposes have been provided whose efficiency depended more or less upon forcing a somewhat flattened head of a bolt through an aperture of the plate to be repaired and thereafter rotating the inserted head through a small arc to avoid its return back through the same aperture, when the repair washer was tightened upon the outer surface of the plate. This method had the great weakness of permitting with greater or less ease such rotation of the head so that it was apt to turn into alinement with the aperture. My present improvement in no way depends upon rotation of the bolt to prevent the loosening of the plug and possible pulling out of the device from the plate aperture.

I fully realize that the scope of my invention extends far beyond the detailed construction illustrated and described in this specification and drawing, and I reserve for myself all the advantages to which I am entitled under the doctrine of equivalents. For example, I contemplate using the said improved device in constructive work, such as securing together a plurality of metallic members, as well as in repair work.

I propose to accomplish these objects by such structure and arrangement of parts as will fully appear by the description in the following specification the appended claims and illustrated in the drawings, in which:

Figure 1:
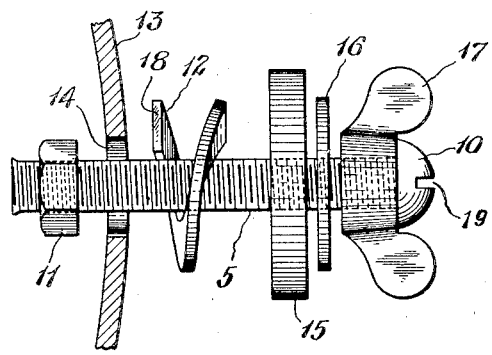
Figure 1 is a side elevation of the device as it is being applied in the aperture of a metal wall, the latter being shown in section.

My device comprises a threaded bolt 5 having a head 10 and provided with a nut 11 applied in the usual manner. As sold on the market the device ordinarily is provided with a wing nut 17 nearest the head, a plain washer 16 adjacent the wing nut, a gasket 15 which is slidable upon the bolt, and a spiral washer 12 somewhat loosely mounted upon the bolt between the nut 11 and the gasket. The washer 12 is ordinarily formed of brass or other of the softer metals, so that it will not be tempered in any sense, and will not tend to return to a former position when forced into a particular arbitrary condition. For the service of which I make use, I cut this washer radially, as at the numeral 18 as shown in Fig. 4, and then spring the edges apart somewhat in the direction of the length of the bolt, the opening in this washer 12 being smaller than the area of the nut 11 and about the size of the bolt 5, so that the washer may be moved lengthwise of the bolt whether closed as in Figs. 3 to 5, or sprung open as in Figs. 1, 2, 6 and 7. The edges resulting from the cut at 18 will evidently be sharp and abrupt.

My device may be used for closing an aperture such as 14 of a plate 13, the aperture being somewhat larger than the bolt, and the nut 11 being of such a size that it may be inserted through the aperture. The head 10 of the bolt will be of about the same diameter as the nut 11. It will be understood from the relation of the parts in Fig. 2, that the opening 14 will need to be of a diameter equal to that of the bolt 5 plus the radius of the ring 12, so that by placing the parts as in Fig. 2, the washer 12 may be rotated about the bolt and advanced through the wall 13 in spiral direction to thereby travel upon the bolt and through the aperture from one side of the plate to the other. The spiral washer 12 will then be in the position indicated in Fig. 2.

Figure 2:
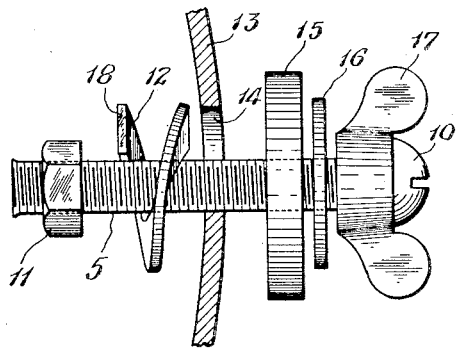
Figure 2 is a similar view shown after the spiral washer has been inserted.
Figure 3:
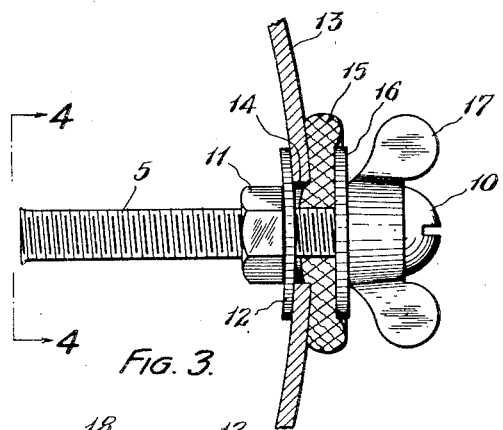
Figure 3 shows the final step, the parts having been tightened about the wall.
Figure 4:
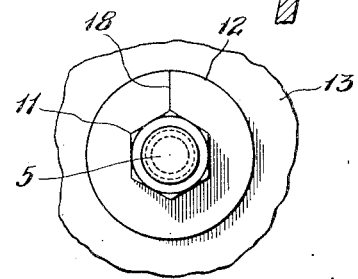
Figure 4 is a face view of the parts in Fig. 3 taken in the direction indicated by the line 4—4 of Fig. 3.

If now, the bolt be rotated by a suitable tool, as by means of a screw driver applied to the slot 19 in the head 10, while the parts are in the approximate relative position shown in Fig. 2 of the drawings, and if at the same time the bolt with the parts 11 and 12 thereon, is drawn outwardly manually by a slight force toward the concave surface of the plate 13, which latter may be the wall of a boiler, until the washer 12 contacts the plate 13 and the nut 11 contacts the washer 12, the abrupt and sharp edges at 18 will contact the plate 13 and nut 11, and serve to hold the nut 11 against rotation with the bolt 5, while the latter is turned by the said tool and the bolt will travel lengthwise through the nut, finally pressing the parts together about the plate until they assume the position shown in Fig. 3. The wing nut 17 may now be further tightened up against the washer 16, the latter pressing the gasket 15 against the outer surface of the plate 13 and very efficiently plugging the aperture 14. The tighter the parts 11, 12 and 15 are drawn by threading of the nuts 11 and 17 upon the bolt 5, against the wall plate 13, the more positive will be the holding of the nut 11 against rotation.

The end of the bolt adjacent the spiral washer is usually upset as at 20, though this is not regarded as strictly essential. Such upsetting however, avoids the losing of the nut on the inside of the boiler or of the washer 12 after it has been rotated through the plate 13. It is now to be appreciated that the washer 12 may be manipulated to enter the boiler through the aperture 14 in wall 13, though the opening in the washer is smaller than the area of the nut 11 and the outer radius of the washer larger than the opening 14. The relative travel of the nut 11 toward the head 10 will therefore, inevitably flatten the washer 12 against the inside surface of the plate 13.

Figure 5:
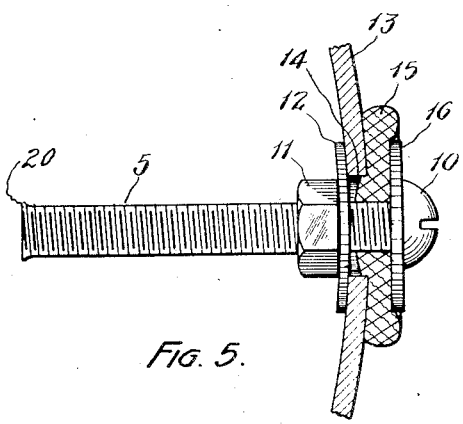
Figure 5 is a view similar to Fig. 3, save that the wing nut is omitted.

In the form shown in Fig. 5 of the drawings, no wing nut is used, though otherwise the conditions may be the same as in the structure of Fig. 3. This is not however, essentially true. The wing nut 17 of Fig. 3 may be retained in Fig. 5, but may be employed to rotate the bolt.

Figure 6:
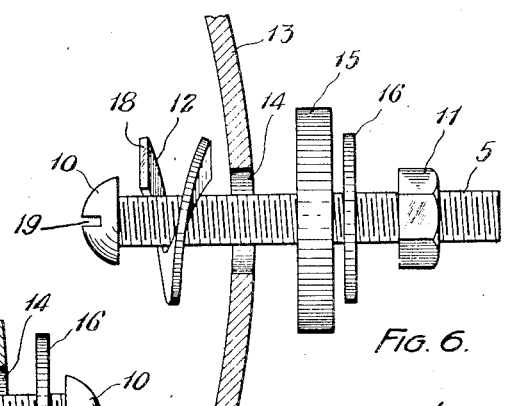
Figure 6 is a view similar to Fig. 2, save that the head of the bolt is first inserted, and the wing nut not used.

A further modification of the use of my improved device, though employing the same inventive principle, consists of the insertion of the head 10 of the bolt through the wall aperture 14, first, and then rotate the washer 12 through the opening to the illustrated position of Fig. 6.

Figure 7:
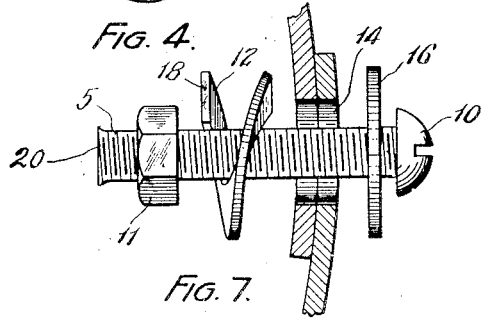
Figure 7 is a modification of the form shown in Fig. 5, except that the rather plastic washer is omitted, since the device is being used to tighten a plurality of metal plates.

Fig. 7 shows another modified use of the improved device herein disclosed. In this form, I suggest the use of the plug for fastening metal plates together, or it may be used to secure wooden or other thin plates tightly together. This is indicated as constructive work, and may be used as for securing galvanized iron plates of walls together in overlapping relation. Such use will be of great value as in building large pipes or stacks and in building cylindrical buildings, as farm silos. In all these structures, it has been heretofore thought essential to have the work done of building the chimney or stack upward by applying the upper plates upon the last-built set of plates in overlapping relation, the operation requiring two men for the purpose in a given situation, the inner man affixing the nuts on the inside surface.

By my present improvement, a man can apply the plug devices from the outside solely, tightening the bolts and nuts up from that position, no artisan being needed on the inside. In all these forms of operation and structures, the opening in the given wall or plates, must be of sufficient size to receive either the nut 11 or the head 10 through it, though a slight tipping of the bolt and the parts carried thereby will often assist in reducing the size of the nut or head permitted to be inserted.

While the plates or walls 13 are shown slightly curved, this is not essential, but is so illustrated to more readily illustrate the inner or outer surface of the walls.

Having thus described my invention, what I claim and desire to secure by Letters Patent is—

1. In a device of the character described, a bolt having an enlarged head, a washer loosely mounted on the bolt adjacent the head, a nut threaded between the said washer and the opposite end of the bolt, and a spiral washer larger than the nut but having an opening of smaller internal area than the same, loosely mounted between the nut and the first washer.

2. As an article of manufacture, a repair plug comprising a threaded bolt having a head at one end, a gasket mounted on the body of the bolt and a nut threaded on the bolt on the side of the gasket opposite the head, in combination with a spiral washer loosely mounted on the bolt and having an opening having an inner area smaller than the area of the nut and having an overall area larger than the nut.

3. As an article of manufacture, a repair plug comprising a threaded bolt having an enlarged head and a threaded nut mounted on the opposite end of the bolt, in combination with a spiral washer having an inner opening smaller than the nut or head and an overall area larger than the same.

4. As an article of manufacture, a repair plug comprising a threaded bolt having an enlarged head and a threaded nut mounted on the other end of the bolt, in combination with a washer loosely mounted on the bolt adjacent the head, a spiral washer mounted on the bolt inside the said nut and having an inner opening smaller than the nut or head and an overall area larger than the nut, and a gasket of relatively larger size mounted on the bolt between the washers.

5. A repair plug for closing the opening in a plate against leakage, comprising a threaded bolt appreciably smaller in radius than said opening and having an enlarged head and a threaded nut mounted on said bolt and of approximately the same size as said opening, in combination with a washer loosely mounted on the bolt adjacent the head, a spiral washer mounted on the bolt between the nut and other washer, a gasket on the bolt larger than the washers, the spiral washer being of a size permitting threading through the opening in either direction and too large to permit insertion therein without rotation.

6. A repair plug for closing the opening in a plate, comprising a threaded bolt smaller in radius than said opening and having an enlarged head and a threaded nut mounted on the bolt and of the same approximate size as the opening, in combination with a plain washer mounted on said bolt spaced from the head, a gasket on the bolt larger than said washer, a wing nut threaded on said bolt between the head and the washer and a spiral washer on the bolt between the nut and gasket, the spiral washer being of size permitting threading through the opening in either direction, and too large to permit insertion therethrough without rotation.

7. A repair plug for use with a metal plate having an opening therein, comprising a threaded bolt smaller in radius than said opening and having an enlarged head and a threaded nut mounted on the bolt and of approximately the same size as the opening, in combination with a washer mounted adjacent the head and too large to pass through the opening, and a spiral washer mounted on the bolt between the nut and the other washer, said spiral washer being of such size as to permit threading the same through the said opening in either direction, and too large to permit insertion therethrough without rotation.

In witness whereof I have hereunto set my hand this second day of April, A. D. 1928.

RAY F. FRYE.